(12) United States Patent  
Kobayashi et al.

(10) Patent No.: US 8,256,530 B2  
(45) Date of Patent: Sep. 4, 2012

(54) METHOD OF PROCESSING ROCK WITH LASER AND APPARATUS FOR THE SAME

(75) Inventors: Toshio Kobayashi, Tokyo (JP); Kazuyoshi Takayama, Sendai (JP); Kiyonobu Ohtani, Sendai (JP); Satoru Umezu, Tokyo (JP)

(73) Assignees: Japan Drilling Co., Ltd., Tokyo (JP); Tohoku University, Sendai (JP); Japan Oil, Gas and Metals National Corporation, Kawasaki (JP)

( * ) Notice: Subject to any disclaimer, the term of this patent is extended or adjusted under 35 U.S.C. 154(b) by 249 days.

(21) Appl. No.: 12/312,719

(22) PCT Filed: Dec. 18, 2007

(86) PCT No.: PCT/JP2007/074326  
§ 371 (c)(1),  
(2), (4) Date: May 22, 2009

(87) PCT Pub. No.: WO2008/090692  
PCT Pub. Date: Jul. 31, 2008

(65) Prior Publication Data  
US 2010/0001179 A1 Jan. 7, 2010

(30) Foreign Application Priority Data

Jan. 26, 2007 (JP) ................................. 2007-016917

(51) Int. Cl.  
*E21B 7/14* (2006.01)

(52) U.S. Cl. .......................................... 175/11; 299/14

(58) Field of Classification Search ................ 175/11, 175/16; 299/14, 16  
See application file for complete search history.

(56) References Cited

U.S. PATENT DOCUMENTS

| | | | | |
|---|---|---|---|---|
| 3,556,600 A | * | 1/1971 | Shoupp et al. | 299/14 |
| 4,066,138 A | * | 1/1978 | Salisbury et al. | 175/16 |
| 5,211,156 A | * | 5/1993 | Jurewicz et al. | 125/1 |
| 5,356,081 A | * | 10/1994 | Sellar | 241/1 |
| 2006/0132919 A1 | * | 6/2006 | Schnell et al. | 359/565 |

FOREIGN PATENT DOCUMENTS

| | | |
|---|---|---|
| JP | A-4-172191 | 6/1992 |
| JP | A-9-242453 | 9/1997 |
| JP | A-2001-170925 | 6/2001 |
| JP | A-2003-293562 | 10/2003 |
| JP | A-2005-88038 | 4/2005 |

(Continued)

OTHER PUBLICATIONS

Gahan et al., "Laser Drilling: Determination of Energy Required to Remove Rock," *SPE* 71466, Oct. 2001, pp. 1-10.

(Continued)

*Primary Examiner* — Kenneth L Thompson  
(74) *Attorney, Agent, or Firm* — Oliff & Berridge, PLC (57) ABSTRACT

An object is to provide a method capable of boring a borehole even when quartz glass or silicon dioxide is deposited as molten dross by laser irradiation. A laser irradiation position of a workpiece is irradiated with a laser having wavelength of 1.2 μm or longer and a high factor of absorption into liquid, for example, a CO2 laser, from a laser oscillator through liquid. By high pressure generated in an advancing microbubble flow occurring in the liquid, molten dross is scattered. Thus, the processing, such as boring, of the rock is performed.

4 Claims, 8 Drawing Sheets

FOREIGN PATENT DOCUMENTS

| JP | A-2006-305803 | 11/2006 |
|---|---|---|
| JP | B2-3856811 | 12/2006 |

OTHER PUBLICATIONS

Institute of Electrical Engineers of Japan, "Laser Ablation and Industrial Application Thereof," Corona Publishing Co., Ltd., Nov. 1999, pp. 1-9, Fig. 1.1 (with partial translation).

Eguchi et al., "Er:YAG laser system for dental treatment," *Proceedings of 39th Laser Materials Processing Conference*, Laser Heat Processing Society (ed.), Nov. 1996, pp. 87-91 (with abstract).

Yamashita, "Recent Advances in IR-Transmitting Fibers for Laser Power Delivery," *Review of Laser Engineering*, vol. 27-3, Laser Society of Japan (ed.), Mar. 15, 1999, pp. 167-172 (with abstract and partial translation).

Matsuura et al., "Hollow Fibers for laser Delivery Systems," *Review of Laser Engineering*, vol. 27-3, Laser Society of Japan (ed.), Mar. 15, 1999, pp. 173-177 (with abstract).

International Preliminary Report on Patentability issued in PCT Application No. PCT/JP2007/074326 on Jul. 28, 2009.

Mar. 9, 2011 Canadian Office Action issued in 2,673,285.

Kruusing, Arvi, "Underwater and water-assisted laser processing: Part 2-Etching, cutting and rarely used methods," Optics and Lasers in Engineering, Feb. 2004, vol. 41, Issue 2, pp. 329-352.

Jun. 10, 2008 Office Action issued in Japanese Patent Application No. 2007-016917 (with translation).

* cited by examiner

FIG. 9

METHOD OF PROCESSING ROCK WITH LASER AND APPARATUS FOR THE SAME

TECHNICAL FIELD

The present invention relates to a method of processing rock with a laser and an apparatus therefor. More specifically, the present invention relates to a technique for processing rock with a laser without any problem even when dross is deposited in working the rock.

BACKGROUND ART

Research has been carried out on the boring and processing of rock with a laser (see, for example, Patent Document 1).

When rock is continuously irradiated with a laser, the rock melts and dross is generated, causing a problem that the dross hinders processing the rock with the laser. In the above technique, to prevent dross from being built up and to thereby avoid hindering the progress in processing the rock, assist gas is blown onto a laser irradiated part to encourage discharge of the dross.

Moreover, when being rapidly and locally heated, some kinds of rock are easily destroyed and other kinds of rock are hardly destroyed, depending on various factors such as the kind, constituents and water content (see, for example, Non-patent Documents 1 and 2).

There is also a processing technique for, for example, processing rock by irradiating the rock with a laser while preventing the deposition of dross by use of fracture characteristics of the rock (see, for example, Patent Document 2).

In this technique, local rapid heating fracture characteristics of rock targeted for working are investigated, and laser intensity and interaction time between the laser and the rock are adjusted on the basis of the investigation, to irradiate the rock with a laser under such irradiation conditions that no dross would be deposited. This technique does not require: addition of any additive agent for increasing the flowability of dross; blowing of assist gas; or the like. Accordingly, the processing of rock can be remotely performed. However, it is difficult to process rock having inappropriate fracture characteristics induced by a laser, such as rock having a high silicon dioxide content, for example.

Further, there is also a technique for excavating a stratum such as an underground resource containing layer in liquid with a laser (see, for example, Patent Document 3).

In this technique, by the induction force of a first laser and the thermal action of a second laser transmitted through bubbles, the stratum in the liquid is excavated. The induction force of the first laser is acquired by an action of a shock wave, a jet flow, a bubble flow or a sound wave, or an action based on a combination of two or more of these phenomena. As the first laser, a pulse laser or a continuous wave laser emitted intermittently is used.

Moreover, it is known that the absorption factor of a laser at which the laser is absorbed into liquid varies depending on the wavelength of the laser, and also that the absorption characteristics of a laser vary depending on the wavelength (see, for example, Non-patent Document 3). A laser having a longer wavelength has a higher factor of absorption into liquid.

Meanwhile, fibers capable of transmitting a laser having a long-wavelength range have emerged.

For example, for a wavelength range in which the wavelength of a laser is no less than 2.0 μm, infrared-transmitting fibers (IR-transmitting fibers) are used. IR-transmitting fibers are optical fibers capable of transmitting infrared light having a wavelength longer than the transmission limit of silica optical fibers (approximately 2 μm). In the case of using a Ho-YAG laser (approximately 2 μm wavelength), a fiber having $SiO_2$ or $GeO_2$ as a core material is used. In the case of using an Er-YAG laser (approximately 3 μm wavelength), a fiber having fluoride glass as a core material is used. In the case of using a CO laser (approximately 5.3 μm wavelength) or a $CO_2$ laser (approximately 10 μm), a fiber having chalcogenide glass as a core material can be used (see, for example, Non-patent Document 4). Alternatively, hollow fibers are also used (see, for example, Non-patent Document 5).

Patent Document 1: Japanese Laid-open Patent Publication No. 2001-170925 (pp. 2-3, FIG. 1)

Patent Document 2: Japanese Laid-open Patent No 2006-305803 (pp. 3-4, FIG. 1)

Patent Document 3: Japanese Patent No. 3856811 (pp. 4-5, FIG. 1)

Non-patent Document 1: B. C. Gahan et al., "Laser drilling: determination of energy required to remove rock," SPE 71466, October 2001 issue Non-patent Document 2: Institute of Electrical Engineers of Japan, investigation committee of laser ablation and its industrial application, ed., "Laser ablation and its industrial application," November 1999 issue, Corona Publishing Co., Ltd., pp. 1-9, FIG. 1.1

Non-patent Document 3: Laser Heat Processing Society, ed., 39th laser heat processing society collected papers (November 1996), pp. 87-91

Non-patent Document 4: Laser Society of Japan, ed., Review of Laser Engineering, Vol. 27-3 (15 Mar. 1999 issue), pp. 167-172

Non-patent Document 5: Laser Society of Japan, ed., Review of Laser Engineering, Vol. 27-3 (15 Mar. 1999 issue), pp. 173-177

Rock often contains quartz glass or silicon dioxide. When such rock is irradiated with a laser, the quartz glass or silicon dioxide is deposited as molten dross due to the heat of the laser. Once molten dross is deposited, even if the rock is further irradiated with a laser to encourage melting, the laser is reflected and scattered, so that the amount of heat of the laser absorbed by the rock is insufficient For this reason, further progress in processing the rock is difficult to make. The dross melting during laser irradiation solidifies when the laser irradiation is stopped, and the borehole is filled with the dross.

The present invention provides a technique capable of processing rock even containing quartz glass or silicon dioxide which is deposited as molten dross by laser irradiation. In addition, in the present invention, a single laser, without using first and second lasers, is used for the processing of rock. An object of the present invention is to provide means for solving the problem that processing is hindered due to generation of molten dross.

DISCLOSURE OF THE INVENTION

The present invention has been made to solve the above-described problems. Technical means of the present invention is a method of processing rock by using a laser, in which characterized in that a laser irradiation position covered with liquid is irradiated with a laser having a wavelength of 1.2 μm, to scatter molten dross, for the processing of the rock.

In the present invention, the processing of rock means ablation of rock, that is, to cause, in rock, a partial fracture event including destruction, fracture, exfoliation, excavation, cutting, drilling, boring and grooving.

In the present invention, a laser having a high factor of absorption into the liquid covering the laser irradiation position is used. The factor of absorption into liquid depends on the wavelength of the laser. A laser having a wavelength shorter than 1.2 μm has a low factor of absorption into liquid, and is thus not suitable here. Accordingly, the wavelength of the laser used in the present invention is limited to 1.2 μm or longer. The use of the laser having the wavelength 2.0 μm or longer is more preferable. Among existing lasers, the wavelength of a semiconductor laser having the longest wavelength is approximately 28.0 μm. The present invention is not intended to exclude a possibility of converting a short wavelength laser to a long wavelength laser by wavelength conversion. Moreover, it is also possible to use two or more long wavelength lasers oscillated by cascade oscillation.

The liquid used in the present invention may be clear or may be opaque. Although any kind of liquid can be used, using water is the easiest and most practical.

As means for making the laser irradiation position covered with the liquid, any one of the following methods may be employed:

(a) placing the rock in liquid, (b) bonding a liquid holding container having a surface facing the rock open, to a surface of the rock, supplying the liquid inside the container, and then irradiating the irradiation position with the laser beam through the liquid, (c) providing and directing a liquid emission nozzle or the like onto the laser irradiation position, and then supplying the liquid, and (d) attaching a jacket or the like, open in an irradiation direction to an end of laser transmission means, and thereby continuously supplying the liquid to the jacket.

As the laser, a fiber laser (1.3 to 1.5 μm wavelength), a coil laser (1.3 μm wavelength) or the like may be used as long as the laser has a high factor of absorption into liquid. Preferably, a semiconductor laser having a long wavelength, such as one selected from a group of a $CO_2$ laser, a CO laser, an Er-YAG laser and a Ho-YAG laser may be used. These lasers have wavelengths of 2.0 μm or longer and can produce high power.

An apparatus for processing rock according to the present invention which can preferably implement the method according to the present invention is characterized by including: liquid supply means that supplies liquid to a laser irradiation position; and a laser emitting device which emits a laser having a wavelength of 1.2 μm or longer, to a surface of rock through the liquid.

In this case, the laser irradiation apparatus does not need to include any transmission medium, but preferably includes a fluoride glass fiber or a chalcogenide glass fiber as the laser transmission medium, when a laser having a wavelength of 2.0 μm or longer is used. Here, a quartz fiber can be used as long as the wavelength is between 1.2 to 2.0 μm inclusive.

By the laser absorbed into the liquid, a rapidly advancing flow of microbubbles occurs in the liquid, and extremely high pressure occurs instantaneously in the bubbles. This pressure is prominent since lasers in a long-wavelength range have a high factor of absorption into the liquid. By the explosive action of the rapidly advancing bubbles occurring due to the laser absorbed into the liquid, molten dross is dispersed and removed. Since a laser having a short wavelength or a mid wavelength has a low factor of absorption into liquid, pressure high enough to disperse and remove the molten dross does not occur in the bubble.

A feature of the present invention is to remove molten dross generated in a cavity created in rock, by using a laser having a high factor of absorption into liquid, and to thereby prevent the dross from hardening in the borehole.

According to the method of the present invention, by covering the laser irradiation position with liquid and using a laser having a high factor of absorption into the liquid, deposited dross can be effectively removed, and the boring and cutting of rock can be facilitated.

Moreover, by using the apparatus of the present invention, the method of the present invention can easily be implemented.

Conventionally, the processing of rock having a high content of quartz glass or silicon dioxide by means of a laser has been difficult. With the present invention, the processing of such rock can be easily performed. Naturally, the processing of rock having a low content of quartz glass or silicon dioxide or quarts-glass-free and/or silicon-dioxide-free rock can also be easily performed by using the method of the present invention.

BEST MODE FOR CARRYING OUT THE INVENTION

The present invention can be used for rock processing techniques in rock processing experiments by the rock processing industry, the civil engineering and construction industry, the mineral resource development industry, corporations and research institutions.

In the rock processing industry, the present invention can be applied to the processing of rock having a high content of quartz glass or silicon dioxide (such as granite). Since the processing of rock is performed through liquid, noise is reduced. Moreover, no dust is produced, preventing harm to human bodies.

In the civil engineering and construction industry, tunnel/bedrock excavation works can be carried out while making less noise than a conventional rock drill does.

In a repair work of a building such as a hospital and a department store, a rock drill is used to carry out a partial demolition work or the like of concrete, stone and the like. In such a situation, business activities need to be suspended because of the noise. The present invention enables a work with reduced noise, so that a repair work can be carried out without suspending business activities.

Also, in research laboratories in corporations, universities and the like, the boring and processing of rock using a low power laser can be readily performed, making it possible to carry out research activities smoothly.

In the mineral resource development industry, a metal bit is used to excavate bedrock. By using a laser instead, non-contact and non-rotation excavation can be carried out. Consequently, a waste attributable to the wear of the metal bit can be reduced.

In the following, an embodiment of the present invention will be described with reference to the drawings.

Figure 1:
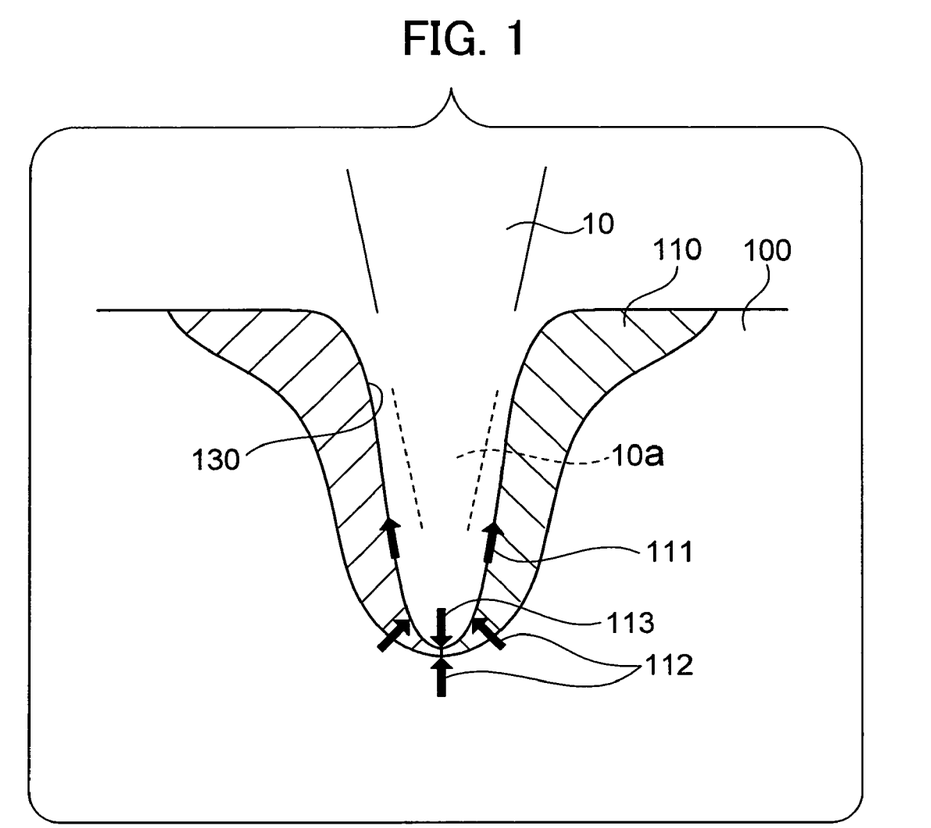
FIG. 1 is an explanatory view of keyhole phenomenon.
Figure 2:
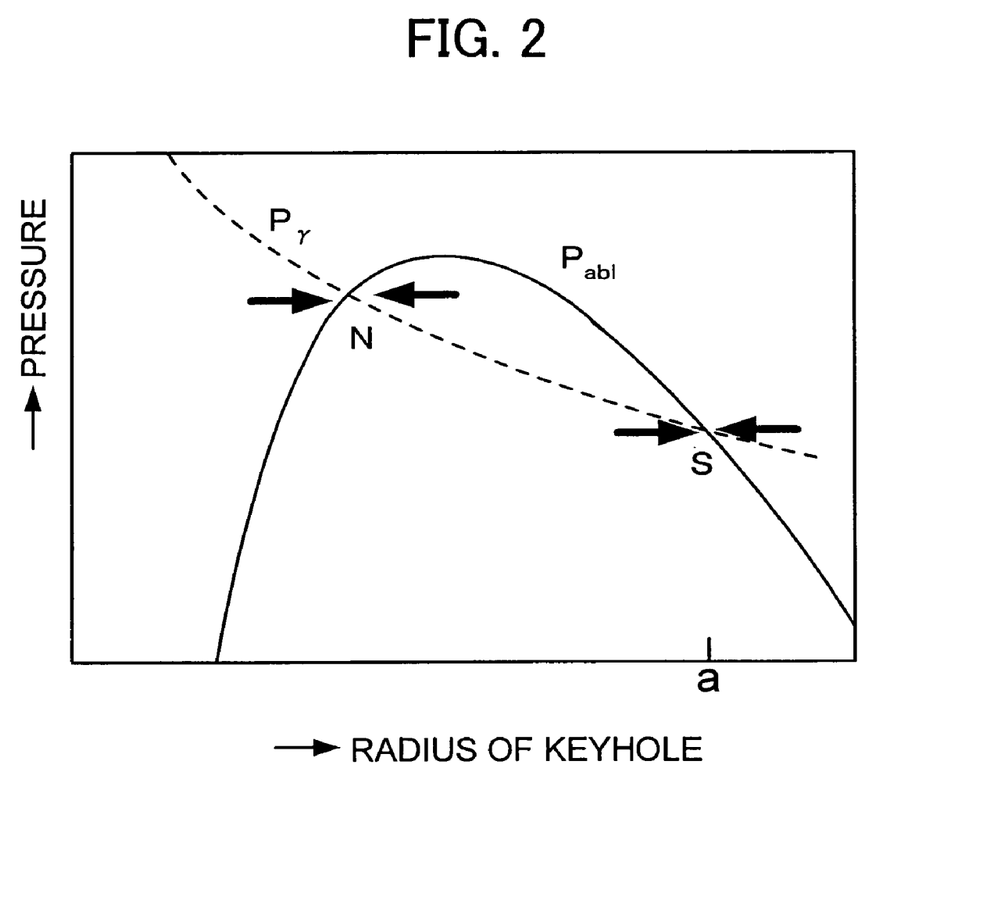
FIG. 2 is a graph showing a balance between surface tension of dross and molten material vapor pressure in a keyhole.

FIG. 1 schematically shows a principle of how a keyhole is formed in rock by laser irradiation.

When a workpiece 100 such as rock is irradiated with a laser 10, some of workpiece constituents may melt to form a melting portion 110, and a keyhole 130 is formed in the workpiece 100 as shown in FIG. 1. Some of the constituents of the workpiece 100 evaporate due to the heat of the laser 10, and vapor pressure 113 occurs. In the thus formed keyhole 130, the keyhole 130 is maintained since surface tension 111 of the melting portion 110 and static pressure 112, which compress the keyhole 130, balance with the vapor reaction force 113, expands the keyhole 130. In FIG. 1, 10a denotes a region where the laser attenuates or reflects.

Figure 3:
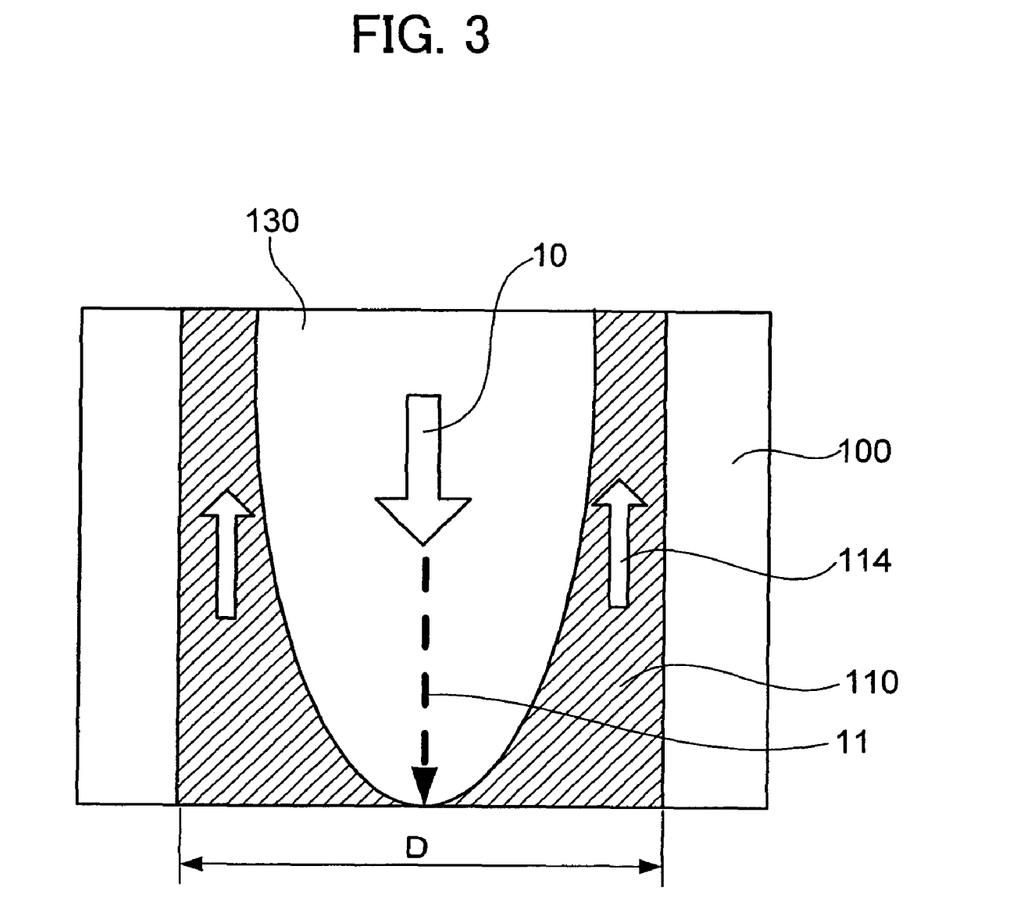
FIG. 3 is a schematic view showing the balance between the surface tension of the dross and the molten material vapor pressure in the keyhole.

For simplicity, assume that the cavity of the keyhole is a cylinder having a diameter D as shown in FIG. 3, and ignore the gravity head. A pressure PS by a surface tension γ is expressed as $PS=2\cdot\gamma/D$.

Vapor pressure PV of the rock balances with the pressure PS by the surface tension of the dross, and a stable keyhole is formed consequently. In other words, for a stable keyhole, PS=PV.

When the irradiation of the laser 10 is stopped, the molten dross 110 generated during the irradiation of the laser 10 is flowed into the keyhole 130, is cooled down, fills the keyhole 130, and then solidifies.

In the present invention, the molten dross inside a cavity in the rock is removed. This event will be described below with reference to the drawings.

The absorption characteristics of the laser 10 with which the laser 10 is absorbed into liquid vary depending on the wavelength. In general, lasers, the wavelength of which fall in a short-wavelength range, have a low factor of absorption into liquid. By contrast, lasers, the wavelength of which fall in either a mid-wavelength range or a long-wavelength range, are highly absorbed into liquid. Examples of lasers, the wavelength of which fall in a long-wavelength range, are a semiconductor laser (maximum wavelength 28.0 μm), a $CO_2$ laser (approximately 10.5 μm wavelength), a CO laser (approximately 5.5 μm wavelength), an Er-YAG laser (approximately 2.9 μm wavelength) and a Ho-YAG laser (approximately 2.0 μm wavelength).

The present invention has been made in light of the fact that the absorption factor of a laser into liquid varies depending on the laser wavelength. With the present invention, molten dross can be removed effectively by using a laser having a high liquid-absorption factor, together with liquid.

In the present invention, molten dross is scattered by using high pressure in an advancing microbubble generated by the absorption of the laser energy into the liquid.

Figure 4:
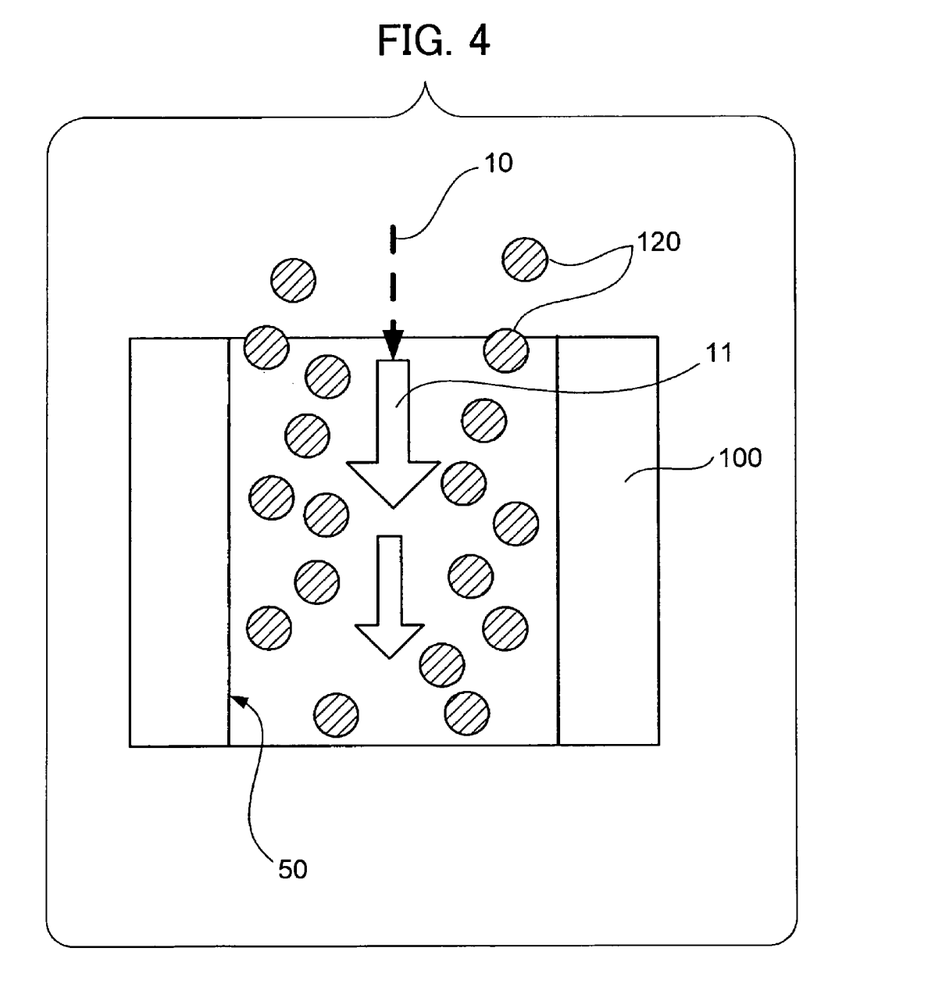
FIG. 4 is an explanatory view showing the dispersion of molten dross.

When the rock 100 is irradiated with the laser 10 through the liquid, the laser 10 having a high liquid-absorption factor generates an advancing flow of microbubbles in the liquid. Thereby, extremely high pressure is generated in the bubbles, and the molten dross 110 is scattered by the explosive action of the pressure. Due to this action, the pressure balance inside the keyhole 130 is destroyed, and the molten dross 110 is dispersed to be fine beads 120 and is then removed as shown in FIG. 4. As a result, since the molten dross 110 has been already removed by the time when the irradiation of the laser is stopped, solidification of the dross never happens. Consequently, a cavity 50 can be prevented from being blocked.

To further increase the pressure in the microbubbles in the liquid that acts on the inside of the cavity in the rock, required is only the use of a laser having a higher factor of absorption into liquid. The energy of such a laser having a high factor of absorption into liquid is highly absorbed into liquid in extremely short time. Accordingly, high pressure occurs in the bubbles.

Even when the dross 110 such as molten quartz glass or the like is deposited, the molten dross 110 is made into small pieces by the impact of the pressure occurring in the bubbles by the absorption of the laser 10 into the liquid, so that the cavity 50 is formed.

An embodiment of the method of the present invention is schematically shown in FIG. 5 to FIG. 8.

Figure 5:
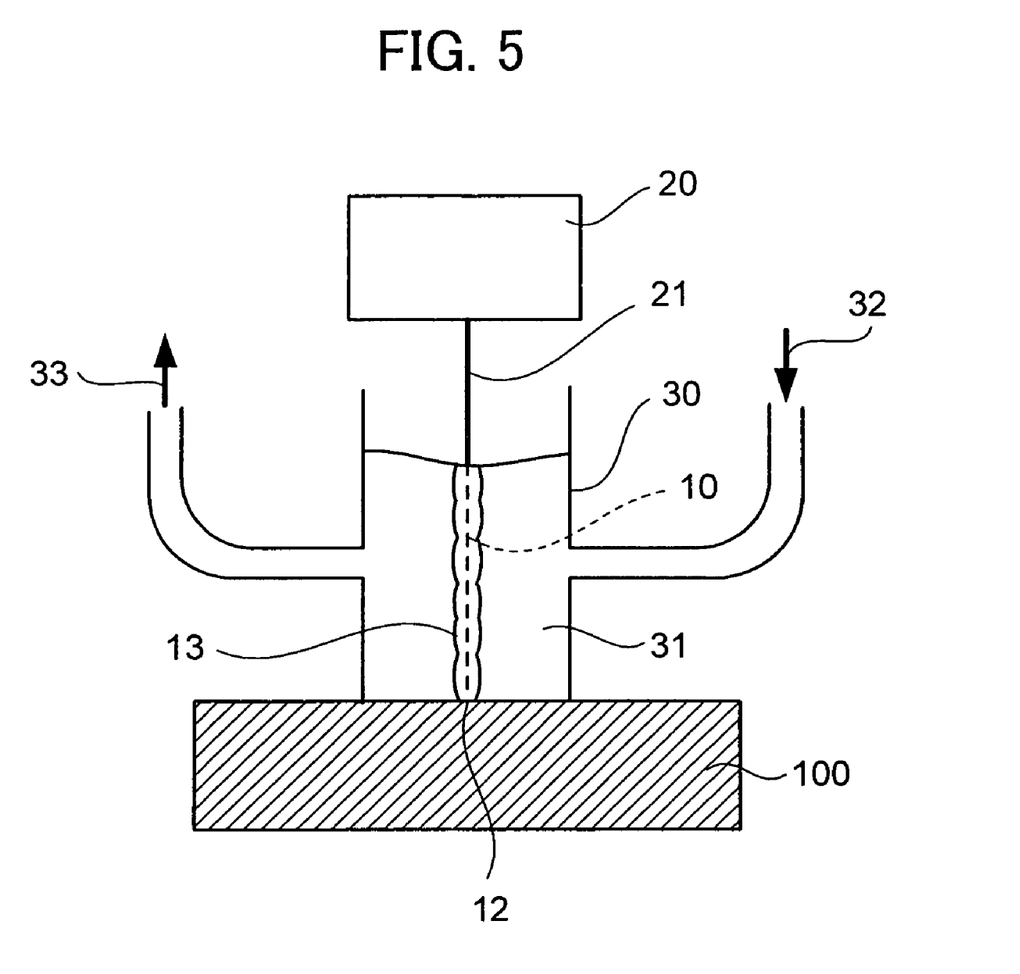
FIG. 5 is a schematic view showing an embodiment of the present invention.

FIG. 5 shows an example of boring with a laser 10 through the rock 100 in which, while liquid is injected into and ejected from a container, the rock 100 is irradiated with a laser through the liquid. A liquid holding container 30 having no bottom is placed on and fixed to an upper surface of the rock 100, and holds therein liquid 31. The liquid 31 is supplied from a supply port 32 and then ejected from an ejection port 33. Thus, the liquid 31 is always held inside the container 30.

The laser beam 10 oscillated by a laser oscillator 20 is emitted to an irradiation point 12 of the rock 100 through the liquid 31. When reaching the liquid 31, the laser beam 10 is absorbed by the liquid 31. Thereby, an advancing microbubble flow 13 occurs in the liquid 31. The advancing microbubble flow 13 suddenly occurs due to the laser beam 10, is accelerated by the laser beam 10, and then reaches the rock 100. Thereby, explosive high-pressure is generated in the microbubbles, and the pressure reaches the laser irradiation part 12 of the rock 100 together with the laser beam 10. The laser beam 10 causes the laser irradiation part 12 of the rock 100 to melt and evaporate, thereby causing ablation. The microbubbles generated in the liquid generate explosive impact pressure, so that the molten dross generated from the rock is made into small pieces and is then scattered. The beads of the scattered dross are diffused into the liquid 31, and are thereby ejected. Through such a process, the boring of the rock is performed.

Figure 6:
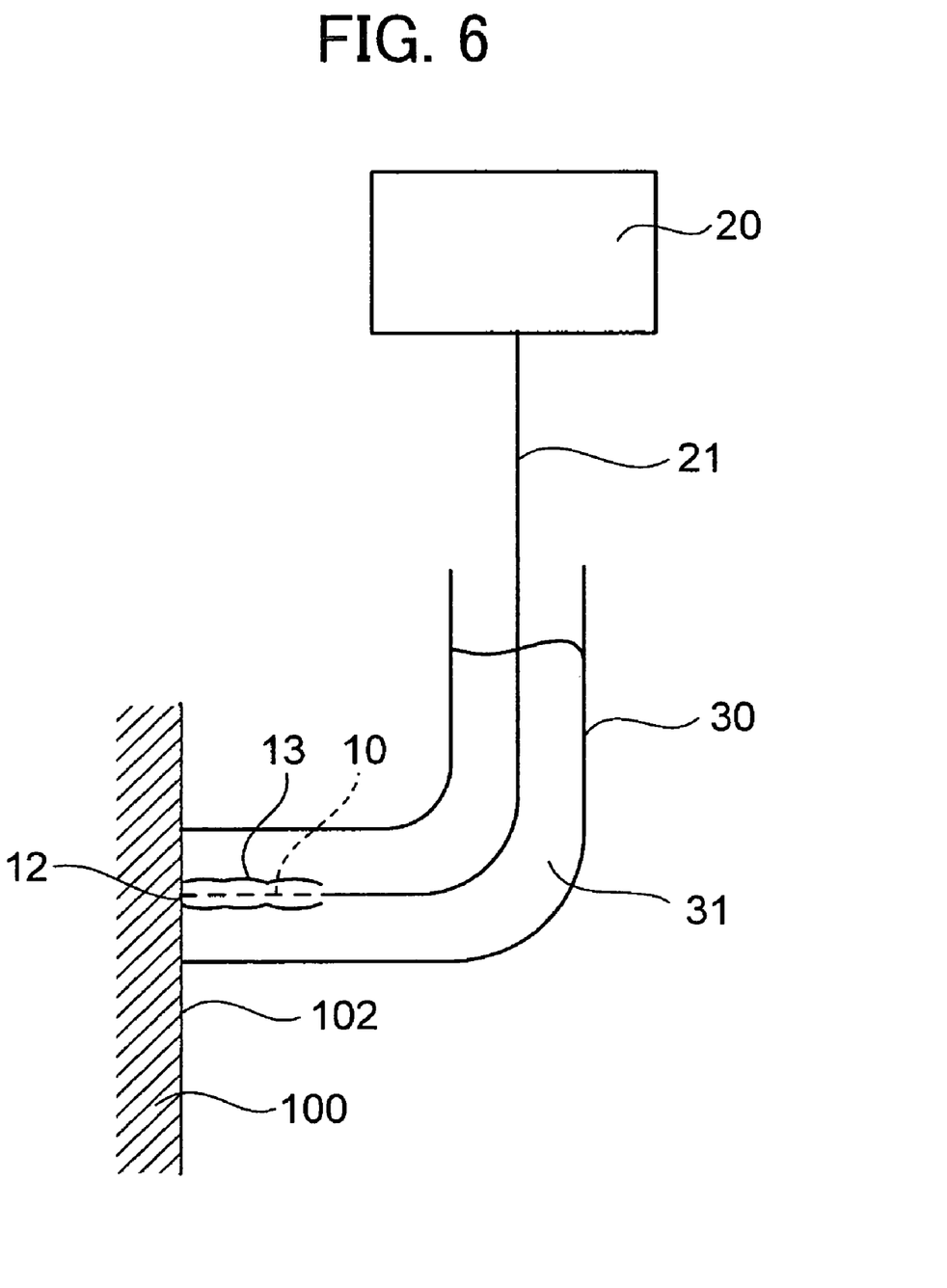
FIG. 6 is a schematic view showing the embodiment of the present invention.

FIG. 6 shows a method of boring through a vertical plane 102 of the rock 100. The liquid holding container 30 is placed on the vertical plane 102 of the rock 100. The container 30 is filled with the liquid 31. The laser beam 10 is emitted to the vertical plane 102 of the rock 100 in the liquid 31 from the laser oscillator 20 by laser transmission means 21 (a fiber or a waveguide).

Figure 7:
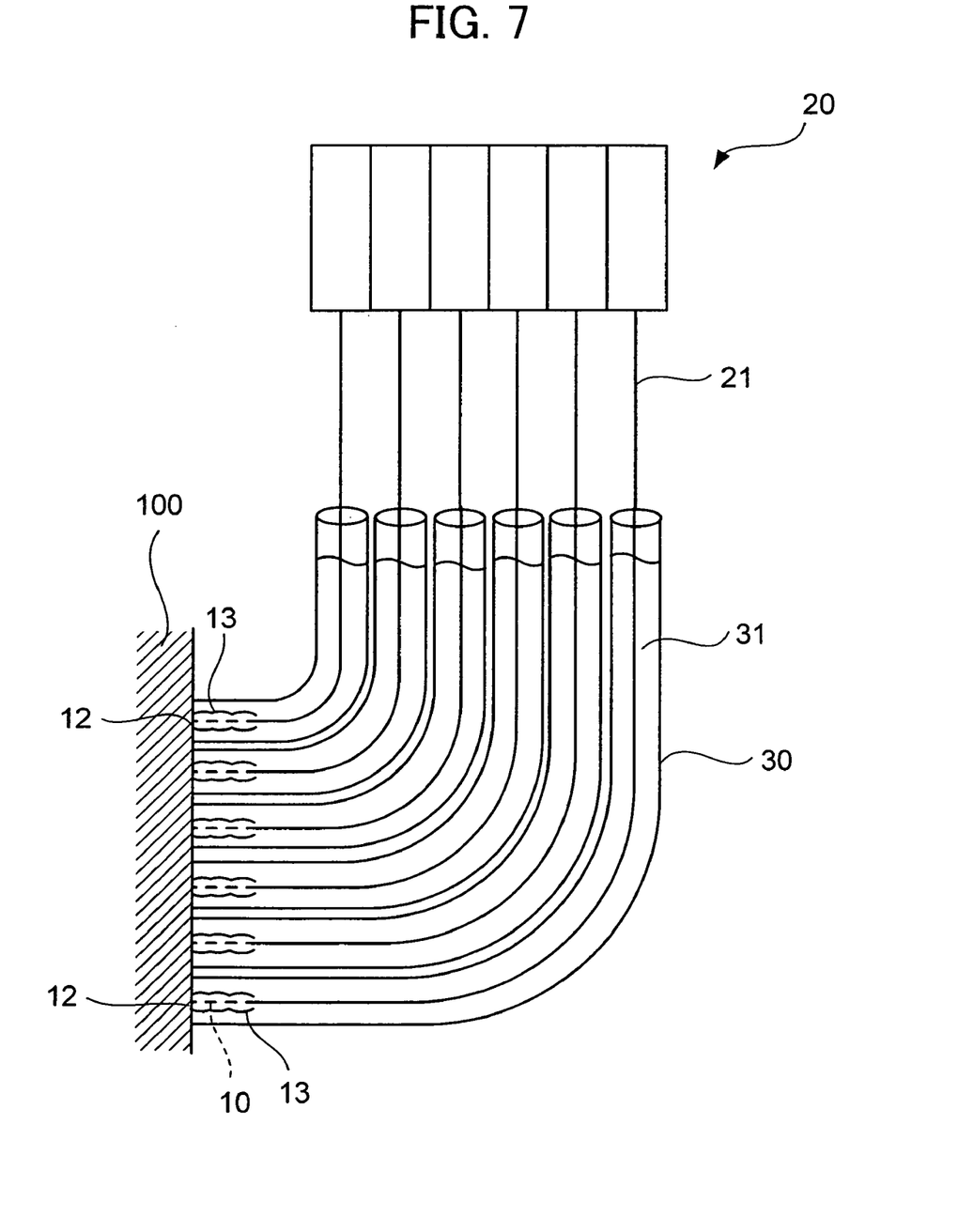
FIG. 7 is a schematic view showing the embodiment of the present invention.

FIG. 7 shows a configuration for boring a hole having a large caliber in the rock 100 by using plural containers and plural lasers. The laser beam 10 oscillated by each of the plural laser oscillators 20 is emitted to the corresponding irradiation point 12 of the rock 100 through the laser transmission means 21 and then the liquid holding container 30. Each of the liquid holding containers 30 is filled with the liquid 31. FIG. 7 shows an example of using plural units each including such a container and a laser.

Figure 8:
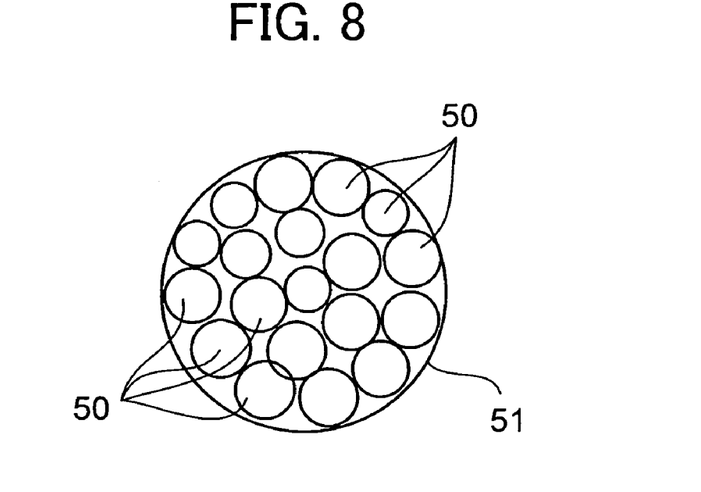
FIG. 8 is a schematic view showing the embodiment of the present invention.

The laser beam 10 oscillated by the laser oscillator 20 of a single unit is emitted through the laser transmission means 21 in the liquid 31. The laser beam 10 emitted in the liquid 31 generates the advancing microbubble flow 13. The laser beam 10 and the advancing microbubble flow 13 reach the irradiation point 12 of the rock 100. Similarly, each unit bores through the rock 100. Accordingly, the group of boreholes 40 by the units forms the hole 50 having a large diameter, as shown in FIG. 8. In this way, the hole 50 having a large diameter is excavated and thus, for example, tunnel excavation is performed.

Here, it is also possible to implement the present invention by using a long-wavelength laser converted from a short-wavelength laser by a wavelength converter.

Figure 9:
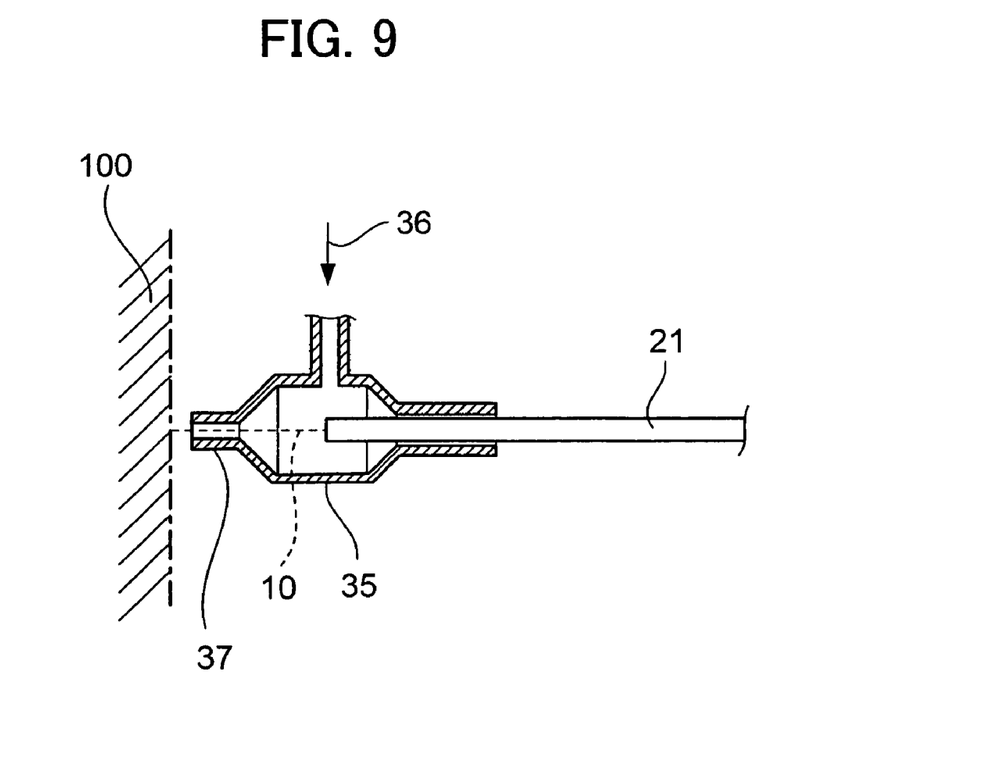
FIG. 9 is a schematic cross-sectional view of an apparatus according to the present invention.

FIG. 9 shows a schematic cross-sectional view of an example of the apparatus according to the present invention. A chalcogenide glass fiber is used as the laser transmission means 21, and a water jacket 35 is attached to a tip end of the laser transmission means 21, as liquid supply means. The water jacket 35 is continuously supplied with water from a water supply pipe 36, and ejects the water from a nozzle 37. The laser beam 10 from the laser transmission means 21 is emitted to the workpiece 100 through the nozzle 37. The laser transmission means 21 may be a multifiber.

EXAMPLE

Boring was performed on a block of Inada granite by laser working. The properties of the target granite are as follows.
Thermal conductivity: 0.13 to 0.2 (cal/cm/s/cdeg)
Mineral Composition:

| | |
|---|---|
| Plagioclase | 22 wt % |
| Quartz | 42 wt % |
| Biotite | 4 wt % |

Chemical Composition:

| | |
|---|---|
| $SiO_2$ | 77.65 wt % |
| $TiO_2$ | 0.19 wt % |
| $Al_2O_3$ | 12.55 wt % |
| $Fe_2O_3$ | 0.46 wt % |
| FeO | 0.98 wt % |
| MnO | 0.08 wt % |
| MgO | 0.18 wt % |
| CaO | 1.44 wt % |

The used laser is as follows.
Laser type: $CO_2$ laser
Laser wavelength: 10.6 μm
Laser output: 5 kW
Liquid: two kinds, water and 4% by weight bentonite solution (opaque)
Laser irradiation direction: upper surface of target By using the apparatus schematically shown in FIG. 5, laser irradiation was performed for 2 minutes. After the irradiation, it was observed that the fine pieces formed from dross was scattered in the water or the bentonite solution. After the irradiation, it was confirmed that a borehole having a diameter of approximately 15 mm and a maximum depth of approximately 50 mm was bored in the granite.

Comparative Example

Laser irradiation was performed under the same condition as that of the example but without making the laser irradiation position covered with liquid. After the irradiation, a state in which molten dross solidified at an irradiation position was observed, and no borehole was successfully formed.

What is claimed is:

1. A method of processing rock by using a laser, comprising:
covering a laser irradiation position with liquid,
irradiating the laser irradiation position with a laser having a wavelength of 2.0 μm or longer which has a high factor of absorption into the liquid,
generating molten dross on a surface of the rock and generating rapidly advancing microbubbles in the liquid by the irradiating, and
processing the rock by dispersing and removing the generated molten dross by using explosive action of the microbubbles.

2. The method of processing rock by using a laser according to claim 1, wherein the laser is any one selected from a group consisting of a semiconductor laser, a $CO_2$ laser, a CO laser, an Er-YAG laser and a Ho-YAG laser.

3. An apparatus for processing rock by using a laser, comprising:
liquid supply means that supplies liquid to a laser irradiation position; and
a laser emitting device that emits, to the rock in the liquid, a laser having a wavelength of 2.0 μm or longer, which generates molten dross on a surface of the rock and generates rapidly advancing microbubbles in the liquid, the microbubbles dispersing and removing the generated molten dross.

4. The apparatus for processing rock by using a laser according to claim 3, wherein the laser emitting device uses any one of a fluoride glass fiber and a chalcogenide glass fiber, as a laser transmission medium.

* * * * *